(12) United States Patent
Vetsch et al.

(10) Patent No.: US 12,371,866 B2
(45) Date of Patent: Jul. 29, 2025

(54) FISH GUIDANCE STRUCTURE

(71) Applicants: ETH Zurich, Zurich (CH); Fäh Maschinen- und Anlagenbau AG, Glarus (CH); Wälli AG Ingenieure, St. Gallen (CH)

(72) Inventors: David Vetsch, Wohlenschwil (CH); Robert Boes, Samstagern (CH); Claudia Beck, Zürich (CH); Ismail Albayrak, Zürich (CH); Claudia Leuch, Brugg (CH); Res Lütschg, Mollis (CH); Tobias Rüesch, Herisau (CH)

(73) Assignees: ETH Zurich, Zurich (CH); Fäh Maschinen- und Anlagenbau AG, Glarus (CH); Wälli AG Ingenieure, St. Gallen (CH)

( * ) Notice: Subject to any disclaimer, the term of this patent is extended or adjusted under 35 U.S.C. 154(b) by 0 days.

(21) Appl. No.: 18/276,475

(22) PCT Filed: Feb. 3, 2022

(86) PCT No.: PCT/EP2022/052601
§ 371 (c)(1),
(2) Date: Aug. 9, 2023

(87) PCT Pub. No.: WO2022/171518
PCT Pub. Date: Aug. 18, 2022

(65) Prior Publication Data
US 2024/0110350 A1  Apr. 4, 2024

(30) Foreign Application Priority Data
Feb. 9, 2021 (EP) .................................. 21155988

(51) Int. Cl.
*E02B 8/08* (2006.01)
*E02B 1/00* (2006.01)
*A01K 61/10* (2017.01)

(52) U.S. Cl.
CPC .............. *E02B 1/006* (2013.01); *E02B 8/085* (2013.01); *A01K 61/10* (2017.01)

(58) Field of Classification Search
CPC . E02B 1/006; E02B 8/08; E02B 8/085; A01K 61/10
(Continued)

(56) References Cited

U.S. PATENT DOCUMENTS 2,826,897 A * 3/1958 Vinsonhaler ............ E02B 1/003
119/219
5,263,833 A * 11/1993 Robinson ................ E02B 8/085
405/83
(Continued)

FOREIGN PATENT DOCUMENTS

DE          10153066 A1 *  5/2003  ............ E02B 8/085
DE     20 2005 019 791 U1    4/2006
(Continued)

OTHER PUBLICATIONS

Taft et al., "An Experimental Approach to the Design of Systems for Alleviating Fish Impingement at Existing and Proposed Power Plant Intake Structures", Third National Workshop on Entrainment and Impingement, pp. 343-365 (23 pages total).
(Continued)

*Primary Examiner* — Frederick L Lagman
(74) *Attorney, Agent, or Firm* — Sughrue Mion, PLLC

(57) ABSTRACT

The present invention comprises a fish guidance rack (2) for use in a fish guidance system in a watercourse (W) at a run-of-river hydropower plant or a water intake. The rack comprises a series of vertical bars (1) mounted on a rack
(Continued)

frame (7) along a longitudinal axis (L) of the rack between a first end (5) of the rack and a second end (6) of the rack. The rack comprises bars with a hydrodynamic curved form, and a generally increasing inter-bar spacing (sb) in the downstream direction.

36 Claims, 5 Drawing Sheets

(58) Field of Classification Search
USPC .......................................................... 405/81
See application file for complete search history.

(56) References Cited

U.S. PATENT DOCUMENTS

| | | | | |
|---|---|---|---|---|
| 6,712,555 | B1 * | 3/2004 | Truebe | A01K 61/00 |
| | | | | 119/219 |
| 6,726,404 | B2 * | 4/2004 | Nestler | E02B 1/006 |
| | | | | 405/80 |
| 7,708,494 | B2 * | 5/2010 | McLaughlin | E02B 8/08 |
| | | | | 405/80 |
| 9,930,744 | B2 * | 3/2018 | Sills | A01K 79/02 |
| 2006/0236950 | A1 | 10/2006 | Patrick et al. | |
| 2012/0003046 | A1 * | 1/2012 | Meeks | E02B 1/006 |
| | | | | 405/81 |
| 2012/0228202 | A1 * | 9/2012 | Bailey | B01D 35/02 |
| | | | | 210/162 |
| 2015/0090189 | A1 * | 4/2015 | Sills | H05B 45/20 |
| | | | | 315/297 |
| 2020/0039687 | A1 | 12/2020 | Paczek et al. | |

FOREIGN PATENT DOCUMENTS

| | | | | |
|---|---|---|---|---|
| RU | | 2770371 C2 * | 4/2022 | |
| WO | WO-2021170753 A1 * | | 9/2021 | ............ A01M 29/24 |

OTHER PUBLICATIONS

Ismail Albayrak et al., "Fish guidance structures; hydraulic performance and fish guidance efficiencies", Journal of Ecohydraulics, 2020, pp. 113-131, vol. 5, No. 2.

Stephen V. Amaral et al., "Evaluation of Angled Bar Racks and Louvers for Guiding Silver Phase American Eels", American Fisheries Society Symposium 2003, pp. 367-376, vol. 33.

Claudia Beck, "Fish protection and fish guidance at water intakes using innovative curved-bar rack bypass systems", VAW-Mitteilung 257, Laboratory of Hydraulics, Hydrology and Glaciology, 2020, 242 pgs.

Claudia Beck et al., "Hydraulic performance of fish guidance structures with curved bars—Part 1: head loss assessment", Journal of Hydraulic Research, 2020, pp. 807-818, vol. 58, No. 5.

Claudia Beck et al., "Hydraulic performance of fish guidance structures with curved bars: Part 2: Flow fields", Journal of Hydraulic Research, 2020, pp. 819-830, vol. 58, No. (5).

Claudia Beck et al., "Swimming Behavior of Downstream Moving Fish at Innovative Curved-Bar Rack Bypass Systems for Fish Protection at Water Intakes.", Water, 2020, pp. 1-25, vol. 12, No. 11.

S.V. Amaral et al., "Review of Downstream Fish Passage and Protection Technology Evaluations and Effectiveness", EPRI (Electric Power Research Institute), TR-111517, 1999, 146 pgs.

S. Amaral et al., "Evaluation of Angled Bar Racks and Louvers for Guiding Fish at Water Intakes", EPRI (Electric Power Research Institute) and Dominion Millstone Laboratories, 2001, Report 1005193:106 pgs.

C. R. Kriewitz, Leitrechen an Fischabstiegsanlagen—Hydraulik und fischbiologische Effizienz ('Guidance screens at fish protection facilities—Hydraulics and fish-biological efficiency'), VAW-Mitteilung 230, R.M. Boes, ed. Laboratory of Hydraulics, Hydrology and Glaciology (VAM); 2015, 352 pgs.

Sylvain Raynal et al., "An experimental study on fish-friendly trashracks—Part 2. Angled trashracks", Journal of Hydraulic Research, 2013, pp. 67-75, vol. 51, No. 1.

D. Shepherd et al., "An experimental study of louvers for fish diversion", Can. J. Civ. Eng., 2007, pp. 770-776, vol. 34, No. 6.

Victor J. Schuler et al., "Improved Fish Protection at Intake Systems", Journal of the Environmental Engineering Division, Dec. 1975, pp. 897-910, vol. 101, No. 6.

International Search Report for PCT/EP2022/052601 dated, May 11, 2022 (PCT/ISA/210).

Written Opinion of the International Searching Authority for PCT/EP2022/052601 dated, May 11, 2022 (PCT/ISA/237).

* cited by examiner

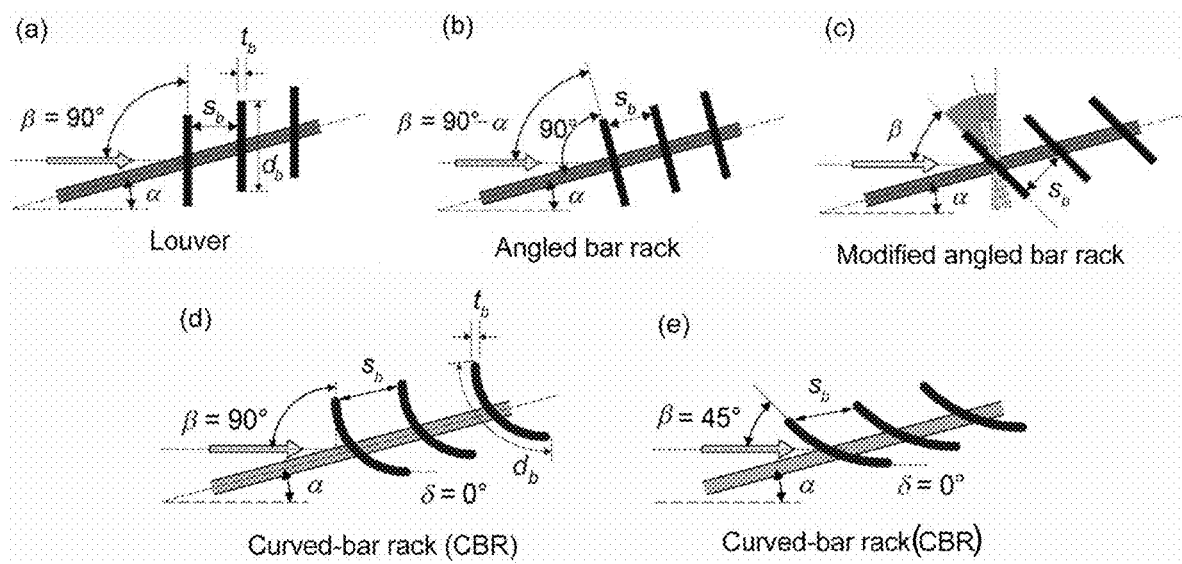
FIG. 1
(Prior Art)
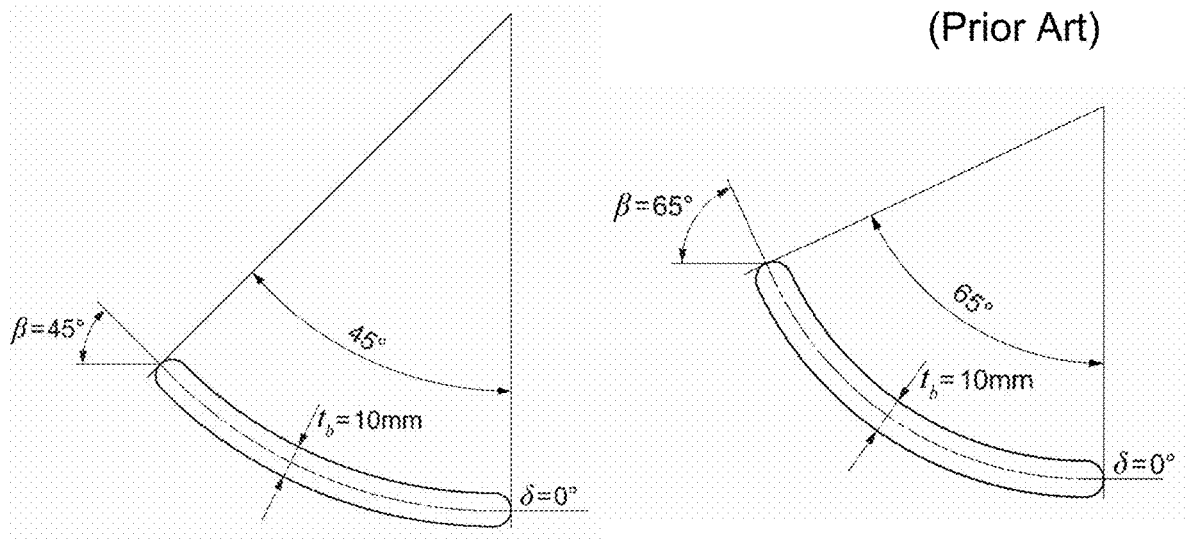
FIG. 2A
(Prior Art)
FIG. 2B
(Prior Art)
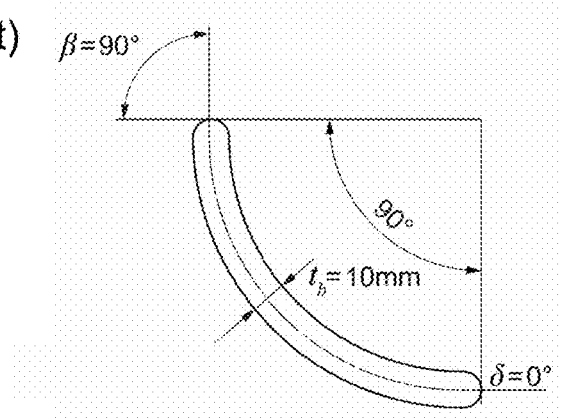
FIG. 2C
(Prior Art)

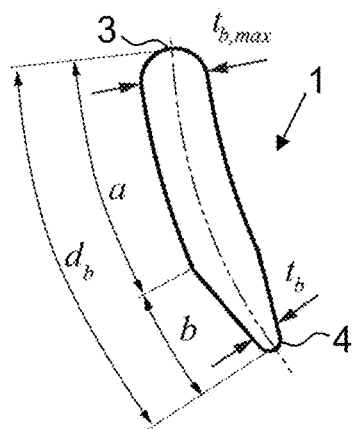
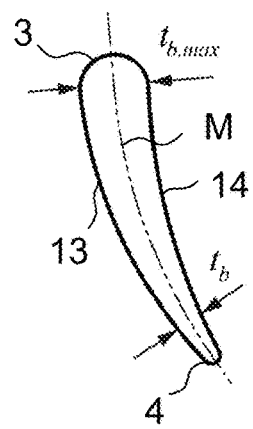
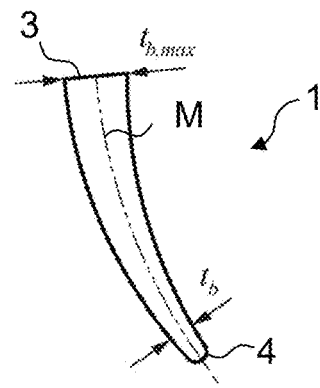
FIG. 7A           FIG. 7B           FIG. 7C
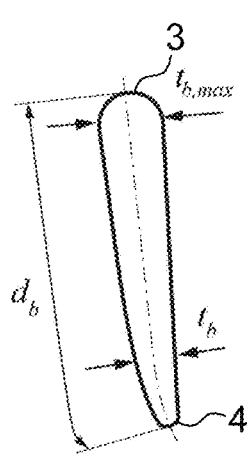
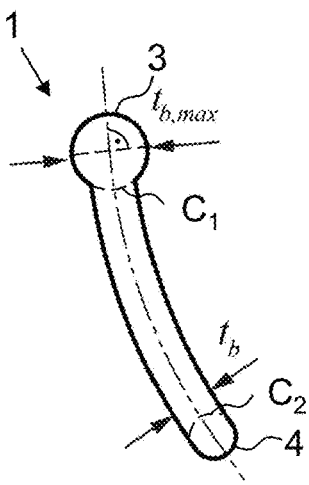
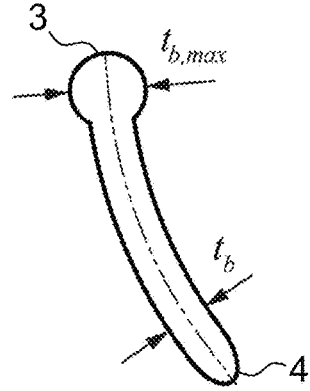
FIG. 7D           FIG. 7E           FIG. 7F
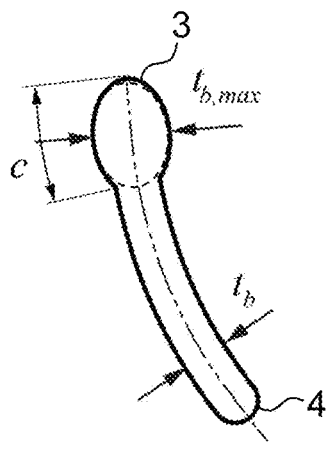
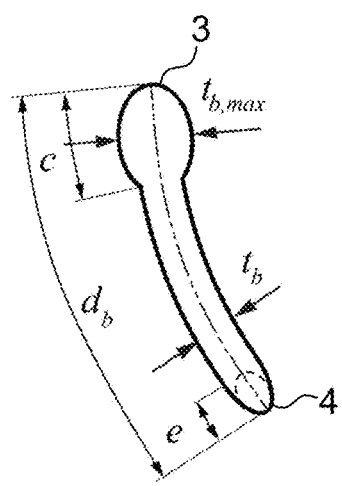
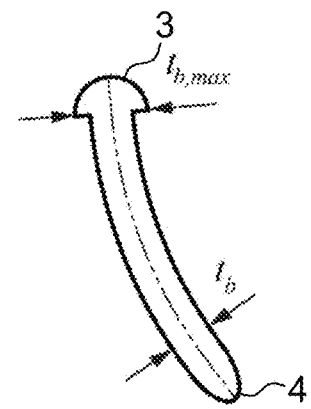
FIG. 7G           FIG. 7H           FIG. 7I

FISH GUIDANCE STRUCTURE

CROSS REFERENCE TO RELATED APPLICATIONS

This application is a National Stage of International Application No. PCT/EP2022/052601 filed Feb. 3, 2022, claiming priority based on European Patent Application No. 21 155 988.5 filed Feb. 9, 2021.

TECHNICAL FIELD

The present invention relates to a fish guidance structure with vertical bars for the protection and guidance of downstream moving fish in a flowing water current.

PRIOR ART

Run-of-river hydropower plants pose a particular threat for downstream moving fish because of high injury and mortality rates during turbine and spillway passages leading to a decline in fish populations worldwide.

Fish guidance structures with vertical bars, combined with a bypass, can protect and guide fish and ensure their safe downstream movement by providing effective mechanical and behavioral barriers at waters intakes. Louvers and angled bar racks are successfully used to protect anadromous fish at several large hydropower plants in the northern USA. Fish guidance structures with vertical bars and larger bar openings, compared to narrowly spaced bar racks function as mechanical and behavioral barriers by creating hydrodynamic cues by their bars. When approaching the structure, fish should be able to perceive the turbulence, high pressure and velocity gradients around and between the bars, resulting in avoidance behavior. The velocity component parallel to the structure guides the fish towards the bypass without causing a delay, fright, exhaustion or shock from a physical contact at run-of-river hydropower plants and other intakes such as pump storage, irrigation, or cooling water intakes (Beck et al., 2020). Such structures also function as physical barriers for larger fish whose width is larger than the bar opening. The optimal hydraulic performance of these structures is essential for a sustainable power plant operation and efficient fish guidance. Louvers are shown to successfully provide a fish guidance effect for American salmonid fish species (see Bates and Vinsonhaler, 1957; Schuler and Larson, 1975; Taft et al., 1976; EPRI 1999; EPRI & DML, 2001; Amaral et al., 2003). The suggested fish diversion systems employ straight bars, such as disclosed in U.S. Pat. No. 2,826,897. To improve the flow conditions in the downstream channel, the installation of redirection vanes is suggested therein. Fish guidance structures with straight bars have been studied in detail. Raynal et al. (2013) studied angled bar racks, in which the bars are placed at 90° to the rack axis and therefore the bar angle relative to the approach flow direction changes as a function of the rack angle. However, the hydraulic performance of the angled bar rack designs is insufficient because of high head losses and asymmetric turbine admission flow. Kriewitz (2015) and Albayrak et al., (2020) studied louvers, angled bar racks and modified angled bar racks. In the modified angled bar racks, the bar angle is not a function of the rack angle. Albayrak et al., (2020) showed that modified angled bar racks result in a higher fish guidance efficiency than louvers among five different fish species because of improved flow fields. Curved bars for the application of fish guidance structures were first mentioned by Shepherd (1998, 2007). However, only two different bar shapes were explored and no indications about head losses and fish guidance efficiencies are made. Beck et al. (2020) and Beck (2020) systematically investigated the hydraulic and fish-biological performance of so-called curved-bar racks (CBRs) in laboratory and CFD studies. A CBR comprises a series of vertical bars with a curved cross section. Compared to fish guidance structures with straight bars, the CBRs showed an improved hydraulic performance, and created significantly lower head losses and a symmetric flow field downstream of the rack, which are advantageous for an efficient electricity production. However, the arrangement and the geometry of these bars lead to a high probability of clogging for floating debris. Debris accumulations can significantly increase the head losses and maintenance costs, and lead to a decreased fish guidance effect.

It is thus an object of the present invention to provide an improved fish guidance system with high fish guidance efficiencies at significantly reduced head loss and more uniform downstream flow compared to the fish guidance structures of the prior art, while minimizing operational issues such as clogging of floating debris and sediments.

SUMMARY OF THE INVENTION

The present invention concerns a fish protection and guidance system with vertical bars. The fish guidance rack influences the behavior of the fish in the watercourse and may also function as a physical barrier, depending on the size of the fish and the bar spacing in the rack. It serves to protect downstream moving fish by guiding them to a bypass system without causing a delay, fright, exhaustion or shock from a physical contact at run-of-river hydropower plants and other intakes such as pump storage, irrigation or cooling water intakes. The fish guidance rack according to the invention comprises a series of hydrodynamic vertical bars mounted in or on a rack frame. The term "vertical" refers to the bars being arranged in the watercourse with their height or their longitudinal axis, respectively, extending transversal to the general flow direction of the watercourse and preferably perpendicular to the water surface. The vertical direction preferably is perpendicular or nearly perpendicular (e.g. inclined by 750 or larger to the horizontal) to the longitudinal axis of the rack.

The present invention concerns a fish guidance rack for use in a fish guidance system in a watercourse, preferably for use at a run-of-river hydropower plant or a water intake. Said fish guidance rack comprises a series of vertical bars mounted on a rack frame along a longitudinal axis of the fish guidance rack between a first end of the fish guidance rack, and a second end of the fish guidance rack.

"Vertical" in this sense means that the bottom end of each bar is directed towards a bottom of the watercourse across which the rack containing the bars is to be installed. The top end of each bar is arranged toward a surface of the watercourse in an installed state, and the length of each bar is arranged along the height, i.e. the depth of the watercourse.

The bars each comprise a first, upstream half beginning with an upstream tip, and a second, downstream half ending in a downstream tip. "Upstream" and "downstream" are to be understood as being with respect to the general flow direction of the watercourse, partially across which the fish guidance rack is to be placed. Local deviations of flow along the bars, possibly due to a turbulent boundary layer created by neighbouring bars, are disregarded for the purpose of using the flow direction as a reference direction. The downstream half adjoins the upstream half in a downstream direction of the bar with respect to a general flow direction of the watercourse in an installed state of the rack.

Installed on the fish guidance rack according to the present invention, at least a number of the hydrodynamically designed bars comprise at least partially a curved horizontal cross section. The bars each comprise, at least along a part of the depth of the bar, a convex curvature of the first side with respect to the first, upstream end of the fish guidance rack. i.e. the bar bulges towards the first end of the rack and thus towards the first limiting structure of the watercourse, when the rack is installed in the watercourse as a component of a fish guidance system. As the first end of the rack, when installed partially across a watercourse, faces the first limiting structure of the watercourse, and thus is directed away from the bypass channel, the first end of the rack is also termed the first, upstream end of the rack.

Preferably, the bars also comprise, at least along a part of the depth of the bar, a concave curvature towards the second end of the fish guidance rack. As the second end of the rack faces the bypass channel in an installed state of the rack, to which the fish are supposed to be guided, and is located further downstream than the first end of the rack, with respect to the general flow direction of the watercourse, the second end is also termed the second, downstream end of the rack. Therefore, the first, upstream side of the bar directed towards the first, upstream end of the rack in an installed state, comprises a convex curvature towards said first, upstream end of the rack and thus directed away from the bypass channel. The second side of the bar is directed towards a third, intermediate limiting structure, and thus towards the bypass of the fish guidance system. The third, intermediate limiting structure extends along a limited section of the watercourse, preferably along the flow direction and parallel to the first and second limiting structures, thus dividing the watercourse into a power canal and a bypass. The second side of the bar preferably comprises, at least partially a concave curvature towards the second end of the fish guidance rack. The first, upstream side and the second, downstream side of the bar need not be curved symmetrically, i.e. an asymmetrical curving of the two opposite sides is conceivable. It is also possible, however, that only the first, upstream side is curved in a convex manner, while second side of the bar is straight.

The curvature is to be understood, when viewed in the horizontal cross section of the bar, as a local deviation of a straight line, which is a line orthogonally intersecting a tangent line on the upstream tip of the bar. The horizontal cross section is to be understood as a cross-section of the bar transversally to its length or height in the vertical direction of the watercourse, in a sectional plane parallel to the surface of the watercourse.

Along a downstream direction with respect to the general flow direction of the watercourse in an installed state, and when viewed along a depth of the bar in the horizontal cross-section of the bar, the bars each comprise a maximum, first thickness in the first, upstream half of each bar. The first half is defined as extending along the first half of the depth of the bar in the horizontal cross-section measured from the upstream tip to the downstream tip of the bar. This results in the fish guidance rack comprising a minimum clear bar spacing between respective upstream halves of neighboring bars, essentially between respective locations of maximum, first thickness in the upstream halves of two neighboring bars.

This minimum clear bar spacing is the shortest distance between two neighboring bars measured along the longitudinal axis of the rack, i.e. the shortest distance between respective first, upstream halves of neighboring bars arranged next to each other along said longitudinal rack axis. This minimum clear bar spacing is essentially measured between respective regions or locations of maximum thickness of the respective neighboring bars. The present invention is characterized in that in a downstream direction from respective locations of maximum, first thickness in respective upstream halves of neighboring bars, to the respective downstream tips, the clear bar spacing between neighboring bars in the fish guidance rack either only increases or remains partially equal and partially increases. "Partially" is to be understood as section-wise in the downstream direction.

By "increasing clear bar spacing" it is meant that the clear bar spacing between neighboring bars never decreases from the upstream tip to the downstream tip of the bar, i.e. that the clear bar spacing between neighboring bars in a downstream direction is never smaller than the minimum clear bar spacing between the respective neighboring bars as defined above. "Increasing" can therefore encompass that the clear bar spacing between neighboring bars increases at a constant or non-constant rate in the downstream direction, or first increases and then remains constant, or first remains constant and then increases at a constant or non-constant rate, but in any case never decreases in a downstream direction starting from the respective locations of the minimum bar spacing between two neighboring bars.

Preferably, the minimum clear bar spacing between neighboring bars lies in a range of 25-50 mm.

Bar shapes with fixed or non-fixed ratios of the maximum thickness of the bar to the downstream thickness of the bar are both conceivable. According to a further preferred embodiment, the rack comprises bars in which the upstream half comprises at least partially a constant thickness and the downstream half of the horizontal cross section of the bar is at least partially tapered towards the downstream tip. Another possible embodiment comprises bars in which the upstream half of the horizontal cross section of the bars comprises a varying thickness, possibly including a tapering section, and comprising at its widest part the maximum, first thickness, while the adjoining downstream half of the horizontal cross section of the bar comprises at least partially a constant thickness smaller than the maximum thickness of the bar in the upstream half, or tapers towards downstream tip. Thus, generally speaking, the horizontal cross-sectional thickness of the hydrodynamic curved bars altogether decreases in the downstream direction, i.e. no part of the horizontal cross-section of the bar in the downstream half of the bar is thicker than the part of maximum thickness measured in the upstream part. In other words, the maximum, first thickness of each bar is larger than any second thickness of the bar in the second, downstream half of the bar.

Preferably the bars, in a region of their respective downstream tips, have a smaller thickness than in a region of their respective upstream tips, such that the clear bar spacing between neighboring bars in a region of the respective upstream tips is smaller than in a region of the respective downstream tips of neighboring bars. Preferably, the location comprising the maximum, first thickness of each bar is arranged within a region encompassing maximum one fourth of the depth of the bar, wherein the depth is measured in the horizontal cross section along a bisecting center line from the upstream tip to the downstream tip of the bar. Various bar shapes are potential candidates for use in a fish guidance rack according to the invention.

Preferably, when mounted in the fish guidance rack, the thickness of each bar decreases continuously in the horizontal cross-section of the bar from the location of maximum, first thickness in the downstream direction to the second, downstream tip, with respect to the general flow direction of the watercourse. This results in that the clear bar spacing between neighboring bars in the fish guidance rack continuously increases from the respective locations of maximum, first thickness to the second, downstream tips of the respective bars. "Continuous increase" means that the clear bar spacing increases continuously from the location of maximum, first thickness in the downstream direction, to the downstream tip, without taking into account a possible stronger local increase of the spacing at the downstream tip due to the rounding or conical tapering of the downstream tip.

This hydrodynamic design resulting in that the distance between the bars is generally smaller in an upstream half than in a downstream half, facilitates the rack cleaning process, and therefore minimizes operational issues such as debris accumulations. In other words, once debris entered into the rack at the front face of the rack, the passing of the debris to and through the rear face of the rack is facilitated due to the hydrodynamic design of the bars.

The bars on the fish guidance rack are preferably arranged in a spaced apart manner, more preferably in an equidistant manner, along the longitudinal axis of the rack from a first, upstream end of the fish guidance rack to a second, downstream end of the fish-guidance rack.

A fish guidance rack according to an especially preferred embodiment of the present invention comprises uniform bars, i.e. bars of only one shape, as seen in the horizontal cross-section. This results in the clear bar spacing being uniform or equal along the entire height of the bars between the respective upstream halves of all neighboring bars, and being uniform or equal between the respective downstream halves of all neighboring bars. It is however, also possible, that bars of two or more different hydrodynamic shapes, preferably in a recurring sequence, are combined in a rack, such that the clear bar spacing is not equal between all neighboring bars. Furthermore, combinations of curved bars and straight bars, such as e.g. in an alternating sequence, are conceivable.

It is also possible that the cross-sectional form of a bar changes along the height of the bar in the vertical direction, as long as the criterion that the minimum clear bar spacing is located in the upstream half of the bar, is fulfilled.

Preferably, the maximum, first thickness of the bar is in the range of 8-16 mm, and the second thickness measured at a narrowest part in the second, downstream half of the bar in the horizontal cross-section is in the range of 4-8 mm. The term "narrowest" in this respect is to be understood as a location in which the second thickness of the bar in the downstream half of the horizontal cross-section of the bar is narrowest with the exception of an additional local narrowing due to a possible rounding or conical tapering of the downstream tip. Preferably, the second thickness of each bar at said narrowest part or location in the second, downstream half of the bar in the horizontal cross section is in the range of 0.375 to 0.625 times the maximum, first thickness of the bar, more preferably about 0.5 times the maximum, first thickness of the respective bar in the upstream half of the horizontal cross section of said bar.

In a further preferred embodiment of the fish guidance rack, the depth of each bar is larger than the maximum, first thickness in the upstream half of each bar, wherein preferably the depth of each bar lies between three times and fifteen times the maximum, first thickness of the bar, more preferably between five times and ten times the maximum, first thickness of the bar. More preferably, the depth of each bar lies in the range of 60-130 mm.

In an installed state of the fish guidance rack in the watercourse, the rack comprises, at the second, downstream tip of each bar, a downstream outflow angle $\delta$, with respect to the general flow direction of the watercourse, which is smaller than the upstream bar-flow attack angle $\beta$ at the first, upstream tip of the bar. Preferably, the downstream outflow angle $\delta$ is 0°-45°, more preferably 0°-20°, most preferably 0°. The fish guidance rack preferably comprises an upstream bar-flow attack angle $\beta$ of at the most 90°, preferably of 45-90° with respect to the general flow direction of the watercourse.

In other words, in combination with a specific rack angle necessary for a specific location or application in a watercourse, bars are chosen to comprise a specific shape, in which the first, upstream side and/or the second, downstream side of the bars are curved in a way that the resulting downstream outflow angle $\delta$ is smaller than the upstream bar-flow attack angle $\beta$. The upstream bar-flow attack angle $\beta$ is measured between the general flow direction of the watercourse at the upstream bar tip and the centerline M bisecting the horizontal cross-section. In case of rounded upstream and downstream tips, the center line M bisecting the horizontal cross-section runs from a first tangent point most upstream on the first, upstream bar tip, to a second tangent point most downstream on the second, downstream bar tip. Therefore, the upstream bar-flow attack angle $\beta$ is measured at the tangent point of the upstream tip where the center line and the tangential intersect. The outflow angle delta $\delta$ is measured in the horizontal cross section of each bar when mounted on the rack at a second tangent point where the center line M and a tangential at the downstream tip intersect, between a center line of the cross-section of the bar and the general flow direction of the watercourse.

According to a further preferred embodiment of the present invention, in an installed state of the rack in the watercourse, the fish guidance rack comprises a horizontal rack angle $\alpha$ of 0-90°, preferably of 10-45°, more preferably of 15-30° to the flow direction of the watercourse, wherein the horizontal rack angle $\alpha$ is measured between a first longitudinal axis of the fish guidance rack and the general flow direction of the watercourse in a plane parallel to a surface of the water course.

The above mentioned dimensions and angles of the bars and rack, as well as the bar height h measured in the vertical direction perpendicular to the surface of the horizontal cross-section and thus perpendicular to the surface of the watercourse, can be selected according to site conditions or material specifications and usually vary among different hydropower plants and water intakes.

Preferably, the upstream tip and/or the downstream tip of each bar is rounded, in order to further reduce head losses and to prevent fish injuries. The rounding can be achieved for example by configuring the upstream tip and/or the downstream tip in the horizontal cross-section with a circular or elliptical form. Besides the upstream tip and/or the downstream tip of each bar comprising a symmetrical, such as a circularly rounded or an elliptically rounded form, other preferably rounded geometrical forms are also conceivable, such as triangular or hexagonal, or other polygonal tips.

An additional bottom overlay or concrete frame along the bottom of the rack can further enhance the fish guidance efficiency for bottom oriented fish such as eel and barbel and might at the same time promote the sediment transport towards the bypass system. An additional overlay or concrete frame at the top might improve the guidance efficiency for surface oriented fish such as salmonid species and also help diverting floating debris towards bypass. A particularly preferred fish guidance rack therefore comprises a bottom overlay or a top overlay, preferably both a bottom overlay and a top overlay. The bottom overlay covers a bottom portion of a front face of the rack, covering an upstream end of the bars, and extends along the longitudinal axis of the rack across, preferably essentially across the entire length of the rack. The front face of the rack is to be understood as being the upstream face of the rack on which the upstream tips of the bars are aligned and/or installed, and which is met first by the flow of the watercourse. The top overlay covers a top portion of the front face of the rack, also covering an upstream end of the bars, and also extends along the longitudinal axis of the rack, preferably across the entire length of the rack.

Preferably, the bottom overlay and/or the top overlay each cover at the most 25% of the height of the bars on the rack, more preferably 5-15% of the height of the bars. However, an absolute minimum of 50 cm in height of both the bottom and the top overlay is recommended.

The present invention further concerns a fish guidance system comprising a watercourse having a general or overall flow direction. At a site where a fish guidance rack as described above is to be installed, such as at run-of-river hydropower plant or a water intake, the watercourse is divided into a power canal and a bypass channel. The fish guidance system thus further comprises a bypass channel and a fish guidance rack as described above, which is suitable to guide fish in the watercourse along a longitudinal axis of the rack towards and into the bypass channel of the fish guidance system. The present fish guidance system therefore includes a bypass system placed at the downstream end of the rack to guide the fish around intakes and release them to the downstream river reaches. This way, no additional attraction flow is necessary and only a small amount of water, i.e. preferably only 1-2% of the design discharge, is used to operate the bypass system. Ideally, the mean flow velocity at the bypass entrance is 10-50% higher than the mean approach flow velocity, preferably 10-20% higher. The fish guidance system can be useful for different types of power plant layouts, the most common being the "diversion type" and the "block type" layout. For example, in case of the block type layout, the watercourse further comprises a weir. In all cases, the fish guidance rack extends across the power canal.

Unlike a conventional trash rack, the fish guidance rack according to the present invention is placed across an intake canal or a forebay at a horizontal rack angle $\alpha$ of 0-90°, preferably of 10-45°, more preferably of 15-30° to the flow direction of the watercourse. The horizontal rack angle $\alpha$ is measured between the longitudinal axis of the fish guidance rack and the flow direction of the watercourse in a plane parallel to a surface of the water course.

The rack installed across the power canal in the fish guidance system according to the present invention comprises at the second, downstream tip of each bar, a downstream outflow angle $\delta$, with respect to the flow direction of the watercourse, which is smaller than the upstream bar-flow attack angle $\beta$ at the first, upstream tip of the bar, preferably a downstream outflow angle $\delta$ of 0°-45°, more preferably of 0°-20°, most preferably of 0°, i.e. most preferably parallel to the flow direction of the power canal. Preferably, the rack comprises, in an installed state in the watercourse, an upstream bar-flow attack angle $\beta$ of at the most 90°, preferably of 45-90° with respect to the flow direction of the watercourse. By placing the bars with an upstream bar-flow attack angle of $\beta \leq 90°$ and a lower outflow angle of $\delta \leq \beta$, a flow-straightening effect is created leading to significantly reduced head losses as compared to bar rack types according to the prior art.

Head loss or pressure drop across the rack is defined as the pressure differential from one side of the rack to the opposite side. Pressure drop occurs because of frictional and pressure drags acting on the bars due to the fluid moving through the rack.

The horizontal rack angle $\alpha$ and the length of the rack at a specific site are selected depending on the flow velocity components normal and parallel to the rack. The upstream bar-flow attack angle and the outflow angle can be selected independently of the horizontal rack angle, by selecting a specific form of the bars to be installed on the rack and by adjusting the installation position of the bars in the rack frame.

The watercourse preferably is delimited on a first side by a first limiting structure, extending in a first vertical plane along, preferably parallel to the flow direction, and on a second side by a second limiting structure extending in a second vertical plane along the flow direction. A third limiting structure extends in a third vertical plane along the flow direction and is arranged between the first limiting structure and the second limiting structure, preferably parallel to the first limiting structure and the second limiting structure. Said third intermediate limiting structure divides the watercourse into a first section and a second section, wherein the first section preferably is a power canal and the second section preferably is the bypass channel. The fish guidance rack extends partially across the watercourse, i.e. preferably across a water intake canal or power canal, from said first limiting structure to said third intermediate limiting structure, preferably at a horizontal rack angle of 0-90°, more preferably 10-45°, most preferably 15-30° to the general direction of flow. In case of a block-type power plant, the rack extends across the power canal from the first limiting structure to a weir. At least a number of the bars of the rack preferably are curved in a convex manner with respect to the first, upstream end of the rack, and thus convex with respect to the first limiting structure of the fish guidance system. Preferably, the bars are also curved in a concave manner with respect to the second, downstream end of the rack and thus with respect to the third, intermediate limiting structure and/or to the bypass channel, respectively. The curved vertical bars in the angled fish guidance rack create flow separations at each bar tip leading to high velocity and pressure gradients upstream of the rack and between the bars, which fish can perceive and react with behavioural avoidance. Fish are guided along the rack to the bypass channel by this avoidance behaviour and by the sweeping velocity, i.e. velocity component parallel to the longitudinal axis of the hydrodynamic curved bar rack.

Fish guidance racks with straight, rectangular bars with a uniform cross-sectional width known from the prior art, create a two-fold flow re-direction leading to high head losses and non-uniform flow conditions behind the rack. The hydrodynamic curved bars in fish guidance racks according to the present invention are placed in such a way that the flow attack angle on the upstream side of bars leads to a high fish guidance efficiency, while the downstream bar outflow angle directs the flow parallel to the downstream channel. This leads to a flow straightening effect and hence uniform downstream flow conditions. As a result, the turbine operation and efficiency are less affected compared to systems with straight bars with a uniform cross-sectional width, i.e. essentially rectangular bars.

The present invention is suitable to be constructed at run-of-river hydropower plants, which have no or an ineffective downstream fish passage facility. Since the bar spacing is relatively wide, it is particularly suitable for large hydropower plants with high design discharges, such as Q>100 m³/s, and high approach flow velocities resulting in velocity components normal to the longitudinal rack axis which are higher than 0.50 m/s depending on the horizontal rack angle, where other systems such as bar racks with horizontal, narrowly-spaced bars would get quickly blocked by floating debris and are not suitable for fish with weak swimming speed and capacity.

The hydrodynamic curved bar racks can be fabricated in the same way and with the same materials as a conventional trash rack. The bars of the rack preferably extend over the entire height from the channel bottom up to a few centimeters above the highest operation water level in the watercourse. A concrete or steel bridge or beam, which can carry a cleaning machine and provide structural support for the rack is useful or necessary.

It is shown that the main parameters affecting the head losses of the hydrodynamic curved or straight bar rack are the rack angle, the bar shape, the bar angle, the bar spacing and top and/or bottom overlays. These parameters can be adjusted individually for different approach flow conditions and need to be optimized for specific site and power plant conditions. An upstream bar spacing should be chosen according to the target fish species and the protection goals, and other site-specific criteria. The parameter values should be chosen by means of CFD simulations and expert knowledge to ensure an economic and efficient operation with high fish protection and guidance. In case a preferred upstream bar spacing of 25-50 mm is chosen, which is similar to the spacing of conventional trash racks, a normal rack cleaning machine can be used to remove floating debris, which gets caught by the rack, while leaves and small plants can pass through the bars. For rivers or streams with high driftwood volumes, it might be advisable to install a removable log boom upstream of the fish guidance rack according to the present invention.

With the fish guidance rack according to the present invention, no additional redirection vanes are necessary, as the flow is redirected by the hydrodynamic bars themselves. In contrast to the regular curved bars or straight bars with a uniform cross-sectional width according to the prior art, the hydrodynamic curved bars according to the present invention minimize the probability of clogging by debris and/or sediments and hence the maintenance efforts and costs. The head losses are significantly lower compared to corresponding louvers and modified angled bar rack configurations with straight bars. With the hydrodynamic bars according to the present invention, expected production losses can therefore be significantly reduced. Furthermore, the flow field downstream of the rack is quasi-symmetrical, improving the efficiency of the hydropower plant turbines. Operational issues such as the accumulation of floating debris are mitigated with the new design of the hydrodynamic curved bar racks compared to the regular curved bar racks according to the prior art. The technical improvements of the present invention contribute to both a sustainable use of clean energy from hydropower and at the same time mitigate the negative impact of hydropower on the downstream movement and migration of fish in the river system by guiding the fish into a safe passage around the hydropower plant.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows in (a)-(e) a schematic view of a portion of five bar racks according to the prior art;

FIGS. 2A-2C shows a schematic cross-sectional view of a conventional curved bar arranged in various angles, such as on a bar rack according to examples (d) or (e) of FIG. 1;

FIGS. 4A-4B shows a perspective view of a fish guidance rack according to the invention, mounted in a watercourse in a fish guidance system; wherein FIG. 4A shows a rack without any overlays according to a first embodiment of the present invention, and FIG. 4B shows a rack with a bottom overlay and a top overlay according to a second embodiment of the invention;

FIG. 7 shows in FIG. 7A-7I schematic horizontal cross-sectional views of nine alternative bar shapes suitable to be used in a fish guidance rack according to the present invention.

DESCRIPTION OF PREFERRED EMBODIMENTS

FIG. 1 shows various horizontal cross sectional shapes of bars applied in louvers or fish guidance racks according to the prior art. In (a), a louver is shown, in (b), an angled bar rack, in (c), a modified angled bar rack, in (d), a curved bar rack with a flow-bar attack angle β of 90° and in (e) a curved bar rack with a flow-bar attack angle β of 45°. The attack angle β tested for the curved bar racks in (d) and (e) in the laboratory varied from 45°-90°, whereas the outflow angle δ was set to 0° to create a flow straightening effect in the power canal. In (d) and (e), with an outflow angle δ of 0°, the second, downstream tip of the vertical curved bars is set parallel to the headrace channel walls, i.e. the limiting structures of the watercourse, while the upstream tip has an angle of 450 or 90°, respectively, to the approach flow direction F.

Louvers consist of vertical bars, conventionally of straight, rectangular shape, oriented with a flow-bar attack angle β of 900 to the flow direction F. In louvers, the bars are thus always orthogonal to the flow direction, independently of the horizontal rack angle α. In angled bar racks, as shown in (b), the longitudinal axis L of the rack is always orthogonal to the longitudinal axis of each bar, and thus the attack angle β varies with the horizontal rack angle α, wherein the flow-bar attack angle β=90°−α. In the modified angled bar rack shown in (c), the flow-bar attack angle β is not a function of the horizontal rack angle α, and β≠90°−α.

Figure 3:
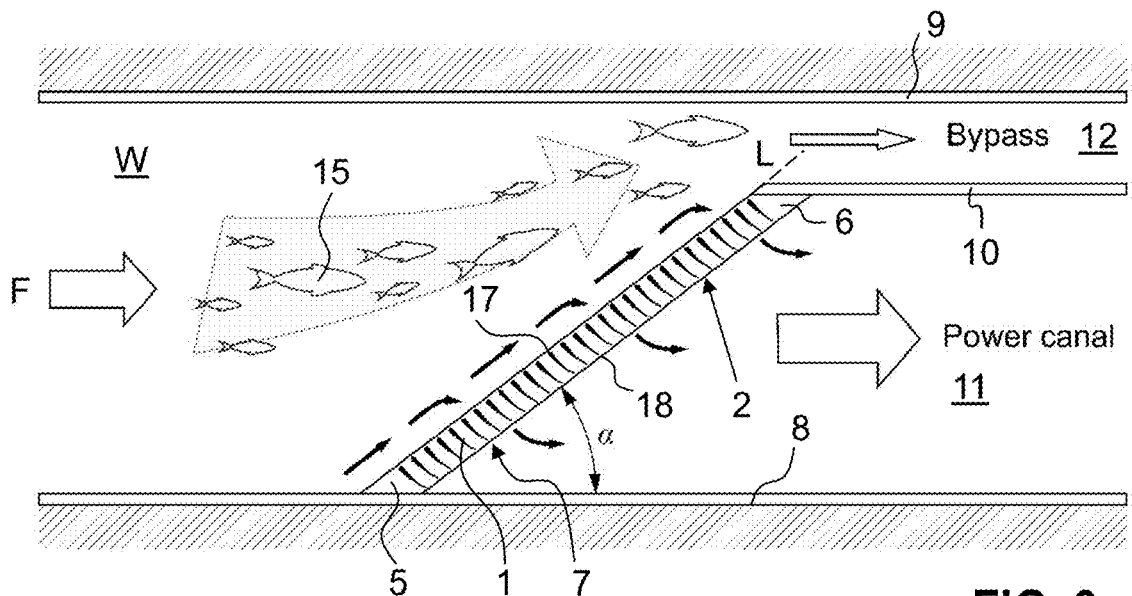
FIG. 3 shows a schematic top view of a bypass system with a first embodiment of the fish guidance rack according to the present invention at a diversion type run-of-river hydropower plant, viewed along the height of the rack perpendicular to the surface of the watercourse.

In principle, all these fish guidance structures work in a similar way, in that fish 15, as e.g. also shown in FIG. 3, perceive the shear zones and pressure gradients in front of the bars 1 at the first, upstream bar tips 3, and are guided to the bypass by the velocity component parallel to the rack 2, i.e. parallel to the longitudinal axis L of the rack 2. The bar and rack angles, bar shape, clear bar spacing, overlay and bypass design of a fish guidance rack are all parameters strongly influencing the hydraulic and fish-biological performance, i.e. head-losses, up- and downstream flow fields, and the fish guidance efficiency.

FIGS. 2A-C are illustrations of three curved bars applicable for a curved bar rack according to the prior art. The bar attack angle β tested in the laboratory varied from 45°-90°, wherein in FIG. 2A, the attack angle β was chosen to be 45°, in FIG. 2B 65°, and in FIG. 2C 90°. The outflow angle δ was set to 0° in all three cases to create a flow straightening effect in the power canal. However, it is possible for the attack angle β to be at the most 90°, and δ<β. FIG. 3 is a top view illustration along the vertical direction of a bypass system with a rack 2 comprising hydrodynamic curved bars 1 at a diversion type run-of-river hydropower plant. The fish are protected from swimming into the power canal 11 by the hydraulic cues from the hydrodynamic curved bars 1 and guided towards the bypass 12. The view is the vertical direction, perpendicular to the surface of the watercourse W, along the height h of the bars 1 in a position as installed on a fish guidance rack 2 in a bypass- or fish diversion system. The rack 2 comprises a front face 17 and a rear face 18. The front face 17 is to be understood as being the upstream face of the rack 2 where the flow of the watercourse W first meets the rack 2. The upstream tips 3 of the bars 1 are aligned at this front face 17. The rear face 18 of the rack 2 is to be understood as being the downstream face of the rack 2 on which the downstream tips 4 of the bars 1 are aligned and/or installed, and where the flow of the watercourse W leaves the rack 2 into the power canal 11.

Figure 4A:
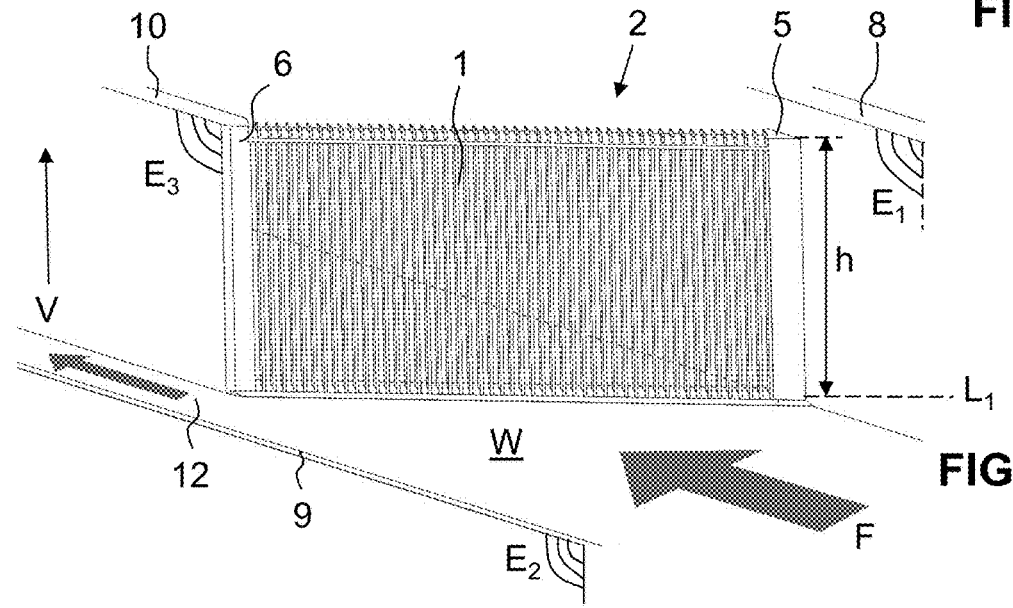

As also shown in FIG. 4A, the watercourse W is delimited on a first side by a first channel wall, i.e. a first limiting structure 8, extending in a first vertical plane E1 along the flow direction F, and on a second side by a second channel wall, i.e. a second limiting structure 9 extending in a second vertical plane E2 along the flow direction F, preferably parallel to the flow direction F. Between and preferably parallel to the first limiting structure 8 and the second limiting structure 9, a third, intermediate limiting structure 10 is arranged, extending in a third vertical plane E3 along the flow direction F, along a section of the watercourse W. Thereby, a power canal 11 is defined between the first limiting structure 8 and the third, intermediate limiting structure 10. The power canal 11 is thus delimited on a first side by the first limiting structure 8, i.e. the first channel wall, and on its second side by the third, intermediate limiting structure 10, and is further delimited on the upstream side by the fish guidance rack 2. The section of the watercourse W between the third intermediate limiting structure 10 and the second limiting structure 9 forms a bypass or bypass channel 12, into which the fish 15 are to be guided. The bypass 12 thus is separated from the power canal 11 by the third, intermediate limiting structure 10. The fish guidance rack 2 is installed partially across the watercourse W, across the power canal 11 or intake canal of a hydropower plant, from the first limiting structure 8 of the watercourse W and extends to the third, intermediate delimiting structure 10. A first end 5 of the rack 2 is thus mounted at the first limiting structure 8 and a second end 6 of the rack 2 is mounted at the third, intermediate limiting structure 10. The fish 15 arriving at the rack 2 are guided past the power canal 11 section of the watercourse W towards the bypass 12. As can be seen in FIG. 3, the bars shown for the illustrated preferred embodiment comprise a convex curvature towards the first, upstream end 5 of the rack 2 and thus towards the first limiting structure 8, and a concave curvature towards the second, downstream end 6 of the rack 2 and thus towards the third, intermediate limiting structure 10.

Figure 4B:
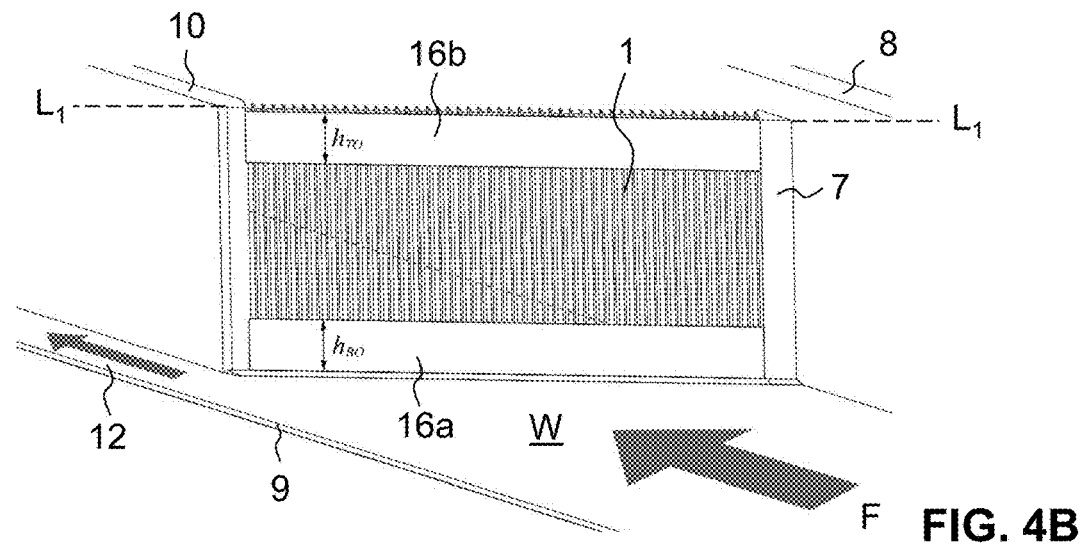

FIGS. 4A and 4B show a fish guidance rack 2 installed partially across a watercourse W between the first limiting structure 8 and the third, intermediate structure 10 of the fish guidance system. The first, upstream end 5 of the rack 2 is installed at the first limiting structure 8 and the second, downstream end 6 of the rack 2 is installed at the third, intermediate structure 10. The bypass channel 12 is arranged between the second limiting structure 9 and the third intermediate limiting structure 10. The rack 2 comprises a series of bars 1 (e.g. shown in FIG. 5) which are each arranged with an upstream tip 3 at the front face 17 of the rack 2, and extending in the downstream direction with respect to the flow direction F of the watercourse W with their depth db to a downstream tip 4 of the respective bar 1 at the rear face 18 of the rack 2. The height h of the bars 1 extends in the vertical direction V perpendicular to the water surface of the watercourse W and perpendicular to the direction of flow F at the upstream tip 3. In FIG. 4A, the rack 2 is shown without overlays 16a, 16b according to a first preferred embodiment of the invention, and in FIG. 4B a variant with a first, bottom overlay 16a and a second, top overlay 16b is shown. Therein, $h_{BO}$ indicates the height of the first, bottom overlay 16a, and $h_{TO}$ indicates the height of the second, top overlay 16b, wherein $h_{BO}$ and $h_{TO}$ each covers at the most 25% of the wetted bar height measured in the vertical direction V, preferably 5-15% of the wetted bar height. The wetted bar height refers to the portion of the height h of the bars 1 which is positioned under water in an installed state on a rack 2 in a watercourse W, and essentially corresponds to the flow depth during normal operating conditions, preferably not taking into the account the width of the frame where the bars are mounted. Absolute overlay heights should not be below 50 cm.

Figure 5:
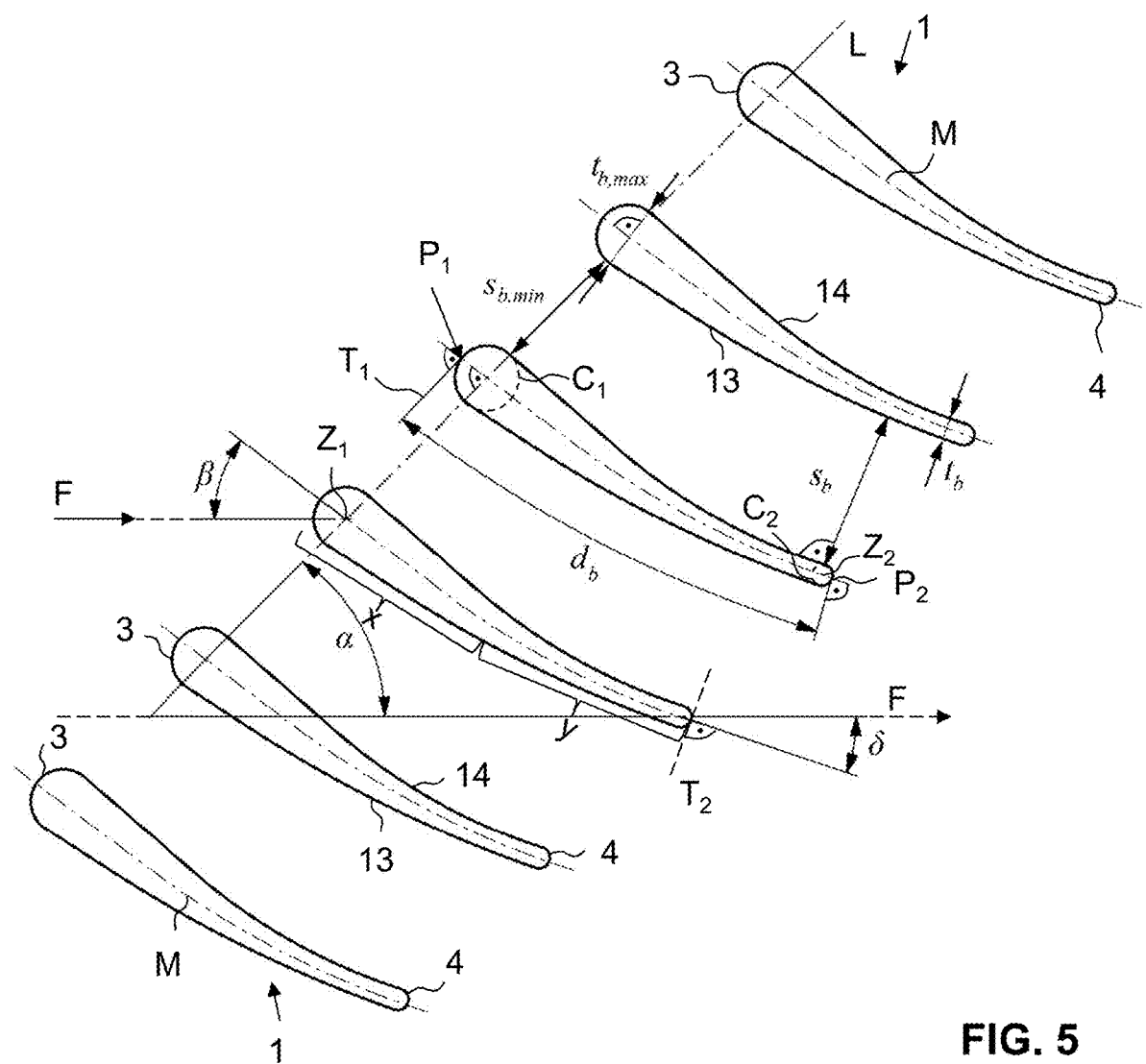
FIG. 5 shows a schematic horizontal cross-sectional view of a series of hydrodynamic curved bars according to a first embodiment as used in a fish guidance rack according to the present invention.

FIG. 5 shows a schematic top view of a series of hydrodynamic curved bars 1 according to a first embodiment of the present invention, suitable to be installed in a rack frame 7 of a fish guidance rack. The illustrated sequence of bars 1 to be mounted on a rack 2 corresponds to an especially preferred embodiment, in that it only comprises hydrodynamic bars 1 with one uniform shape. In the illustrated hydrodynamic curved bars 1, a is the horizontal rack angle to the approach flow or flow direction F at the upstream tip 3. The rack angle α is illustrated here in the horizontal cross section of the series of bars as installed on a rack (not shown), the horizontal cross section of the bars lying in a plane parallel to the surface of the watercourse. β is the flow-bar attack angle measured at a first tangent point P1 at the first, upstream bar tip 3 between the flow direction F and the center line of the upstream bar half, δ is the bar outflow angle measured a second tangent point P2 at the second, downstream bar tip 4. tb,max is defined as a thickness at the widest part of the horizontal cross section of a bar 1 in the upstream half x of the bar 1, i.e. the location with maximum thickness tb,max, in the depicted embodiment in the region of the upstream bar tip 3. tb is defined as any thickness downstream from location of greatest thickness of the bar, i.e. at least any thickness in the downstream half y. In the figures, tb is indicated at the narrowest part of the horizontal cross section of a bar 1 in the downstream half y of the bar 1. In the depicted embodiment of FIG. 5, this part is located in the region of the downstream bar tip 4. db is a depth of the bar 1, measured along the bisecting center line M in the horizontal cross section of the bar 1 from the upstream bar tip 3 to the downstream bar tip 4. The upstream half x of the bar 1 and the downstream half y of the bar 1 thus each extend over half of the depth db of the bar 1, thus x=db/2 and y=db/2.

In case of rounded tips 3, 4, as shown in FIG. 5, the center line M bisecting the horizontal cross-section runs from a first tangent point P1 most upstream on the first, upstream bar tip 3, to a second tangent point P2 most downstream on the second, downstream bar tip 4. sb,min is the minimum clear bar spacing, i.e. the shortest distance between two neighboring bars 1 in the upstream half x, measured along the longitudinal axis L of the rack 2, essentially at the location of tb,max in the respective upper half of the bar 1. sb is a second, downstream clear bar spacing, i.e. any distance between two neighboring bars 1 downstream of the location of minimum clear bar spacing, at least any distance between two neighboring bars 1 in the downstream half y, indicated at the location of tb in the figure, measured orthogonal to the center line M. The horizontal cross-sections of FIG. 5 are cross-sections parallel to the surface of the watercourse W, viewed along the vertical direction V, perpendicular to the water surface, i.e. along the height h of the bars 1, or their longitudinal axis, respectively, in a position as installed on a rack 2 in a bypass- or fish diversion system in a watercourse W.

In the first embodiment of the present invention according to FIG. 5, the first, upstream side 13 of the bar 1 is curved, as is the second, downstream side 14 of the bar. The first, upstream side 13 of the bar 1 is directed towards the first, limiting structure 8 of the watercourse W and is curved in a convex manner, bulging towards the first channel wall 8, i.e. the first limiting structure. The second, downstream side 14 is directed towards or facing the third intermediate limiting structure 10 and thus towards from the bypass channel 12 of the watercourse W, and is curved in a concave manner towards the bypass channel 12. The minimum clear bar spacing sb,min of the bar 1 is located in the first, upstream half x and is the shortest distance measured along the longitudinal axis L of the rack 2 from the surface of one bar 1 to the surface of a neighboring bar 1. Any clear bar spacing sb between two respective neighboring bars 1 measured downstream from the location of the minimum clear bar spacing sb,min, is larger than sb,min, at least between two respective downstream halfs y of two respective neighboring bars 1. In the preferred embodiment of FIG. 5, the clear bar spacing sb increases continuously in a downstream direction, the downstream direction being defined with respect to the general flow direction F of the watercourse W.

Figure 6A:
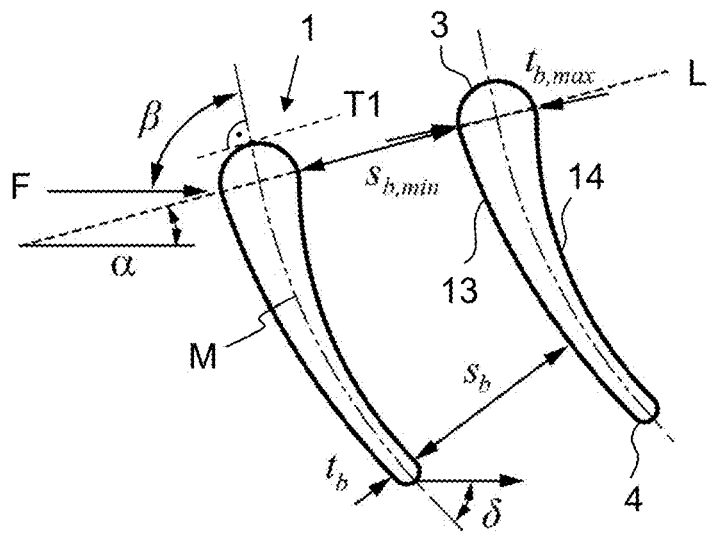
FIGS. 6A-6C shows a schematic horizontal cross-sectional view of two neighboring hydrodynamic curved bars according to FIG. 5 shown with varied bar-flow attack angles, rack angles and outflow angles.
Figure 6B:
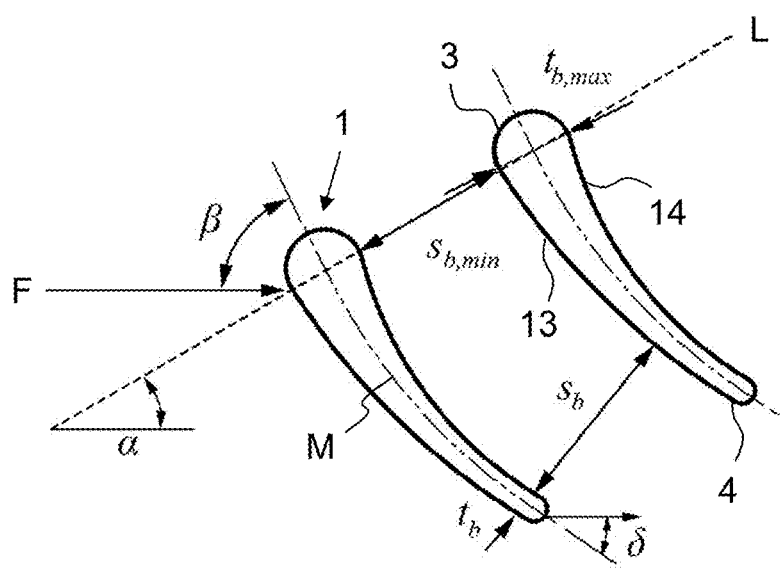
Figure 6C:
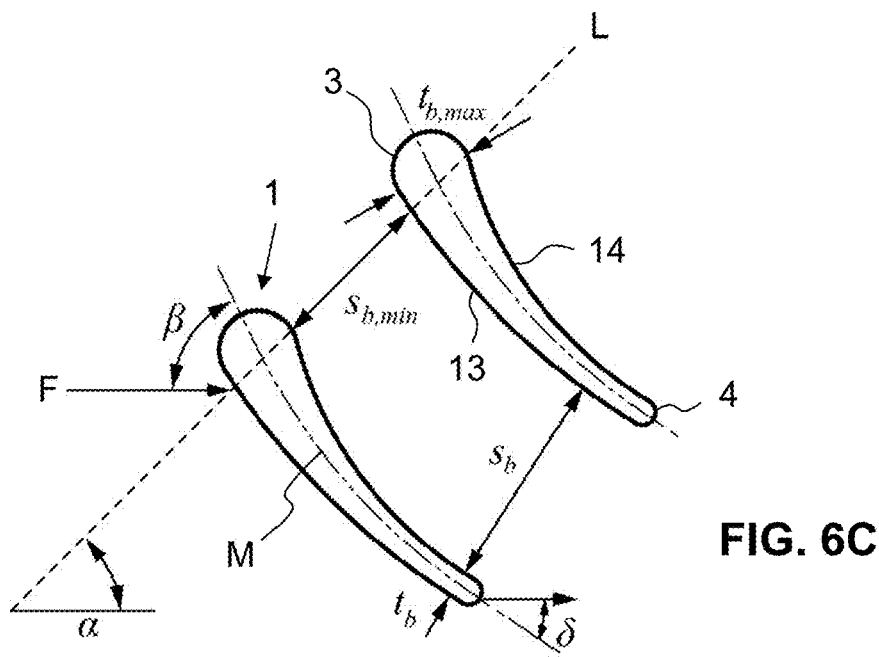

FIGS. 6A-6C each show two neighboring bars 1 shaped according to FIG. 5, wherein three different angle relations are illustrated. In FIG. 6A, a horizontal rack angle of α=150 is chosen, while the flow-bar attack angle is selected to be β=80° and the bar outflow angle is set at δ=45°. In FIG. 6B, a horizontal rack angle of α=30° is chosen, while the flow-bar attack angle is selected to be 3=65° and the bar outflow angle is set at δ=35°. In FIG. 6C, a horizontal rack angle of α=45° is chosen, while the flow-bar attack angle is again selected to be β=65° and the bar outflow angle is again set at δ=35°. Therefore, according to the individual circumstances of the installation of the fish guidance rack, the horizontal rack angle α can be chosen independently of the flow-bar attack angle β and the bar outflow angle δ, the two latter being a result of the specific bar shape and the mounting position of the bar 1 in the rack 2.

FIG. 7 shows alternative shapes of hydrodynamic curved bars suitable to be mounted on a fish guidance rack according to further preferred embodiments of the present invention. In FIG. 7A-7I, the depth of the curved bar 1 is referenced as db.

FIG. 7A shows a curved bar shape which, along a first section a of the bar 1, as seen in the horizontal cross-section, has a configuration with a constant or uniform thickness corresponding to the maximum first thickness tb,max of the bar 1 along said first section a, wherein $0.5 \times tb,max < a < 0.75 \times db$. A second, tapered section or part b of the curved bar 1, adjoining the first section a downstream, has a tapered form towards the downstream tip 4, wherein b=db−a, and $0.25 \times db < b < 0.75 \times db$. In the illustrated embodiment of FIG. 7A, the angle of inclination in the tapered section of the downstream half y is different between the first side 13 and the second side 14 of the bar 1. The downstream tip 4 of the bar 1 is rounded.

In FIG. 7B, a horizontal bar cross section similar to the form shown in FIGS. 5 and 6 is illustrated, however, with a continuous reduction in thickness and thus a more waisted configuration. Both a bar 1 of FIG. 5 or of FIG. 7B could be termed a foil-shaped curved bar.

In FIG. 7C, the illustrated bar 1 comprises a similar form as FIG. 7B, however, with a straight upstream end 3 as compared to the rounded upstream end 3 of FIG. 7B.

FIG. 7D is a schematic view of a hydrodynamic curved bar 1 according to another embodiment of the present invention. The bar 1 shown here is formed in a straight manner along most of the depth db of the bar 1, however, at the downstream tip 4 of the bar 1, the bar 1 is curved, however, only on the first, upstream side 13, while the second, downstream side 14 of the bar 1 is straight. In other words, the bar type according to the illustrated embodiment of the present invention in FIG. 7D comprises a first, upstream side 13 which is curved in a slightly convex manner in the region of the downstream bar tip 4 and a straight second, downstream side 14. As long as the outflow angle δ is smaller than the flow attack angle β of the bar 1, the downstream tip 4 of the bar 1 is curved. Thus, in such an embodiment, only the convex curvature of the first side 13 accounts for the decrease in thickness of the bar 1 in the downstream direction.

FIG. 7E shows a bar shape with a spherical upstream tip 3, which in the horizontal cross-section forms a first circle C1. In this specific embodiment, tb,max is equal to the diameter of said first circle C1 which is described by the upstream tip 3 of the bar 1. In other words, the upstream bar tip 3 in the horizontal cross section describes a segment of this first circle C1. Downstream of the spherical upstream tip 3, the bar 1 has a curved form with a constant thickness tb, which is smaller than tb,max, and thus smaller than the diameter of the first circle C1. The downstream tip 4 has a rounding describing a second circle C2 in the horizontal cross-section. In other words, the rounding of the downstream tip 4 in the horizontal cross section describes a segment of the second circle C2, wherein the diameter of the first circle C1 in the upstream bar tip 3 is larger than the diameter of the second circle C2 in the downstream tip 4. Also in FIG. 7E, the thickness tb in the downstream half y is equal to the diameter of said second circle C2. c is the depth of the upstream tip 3 of the curved bar 1, as shown in FIG. 7G. In the illustrated embodiment with the circular form of the upstream bar tip 3 of FIG. 7E, c=tb,max.

FIG. 7F shows a bar 1 of a similar configuration as FIG. 7E, however, with a tapered downstream tip 4, which in the horizontal cross-section describes an elliptical form. The thickness tb in the downstream half y is measured upstream of the tapered portion of said ellipse.

FIG. 7G shows a similar configuration as FIG. 7E, however, the upstream tip 3 here is elliptical in the horizontal cross-section. Here, tb,max<c<2×tb,max. Here, the depth c of the upstream bar tip 3 equals the length of a major axis of the ellipse and the length of a minor axis of the ellipse equals the maximum thickness tb,max of the upstream tip 3 of the curved bar 1.

FIG. 7H shows a similar configuration as FIG. 7G, however, with a tapered downstream tip 4, which in the horizontal cross-section describes an elliptical form with the depth e, wherein tb≤e<2×tb. Compared thereto, when e=tb, then the downstream tip 4 has a circular form in the horizontal cross-section, as shown in FIG. 7E, 7G. Also in FIG. 7H, the thickness tb in the downstream half y is measured upstream of the tapered portion of said ellipse.

FIG. 7I shows a curved bar 1 with a half-circular upstream tip 3 in the horizontal cross-section. In case of a half-circular configuration, tb,max:tb,max ≤c ≤2 ×tb,max, wherein c=tb, max:2. As in FIG. 7F and 7H, also in FIG. 7I the downstream tip 4 has an elliptical form.

Other forms of the upstream tip 3 and/or the downstream tip 4 in the horizontal cross-section are conceivable, such as triangular or polygonal geometric shapes, however, with rounded ends, so as to prevent fish injury.

LIST OF REFERENCE SIGNS

| | |
|---|---|
| 1 | bar |
| 2 | fish guidance rack |
| 3 | first, upstream tip of 1 |
| 4 | second, downstream tip of 1 |
| 5 | first, upstream end of 2 |
| 6 | second, downstream end of 2 |
| 7 | rack frame |
| 8 | first limiting structure of W, first channel wall |
| 9 | second limiting structure of W, second channel wall |
| 10 | third, intermediate limiting structure of W |
| 11 | first section of W, power canal |
| 12 | second section of W, bypass channel |
| 13 | first, upstream side of 1 |
| 14 | second, downstream side of 1 |
| 15 | fish |
| 16a | bottom overlay of 2 |
| 16b | top overlay of 2 |
| 17 | front face of 2 |
| 18 | rear face of 2 |
| a | section of 1 with constant thickness |
| b | tapered section of 1 |
| c | depth of geometrical form in 3 |
| C1 | circle formed at 3 |
| C2 | circle formed at 4 |
| db | depth of 1 |
| e | depth of geometrical form in 4 |
| E1 | first vertical plane of 8 |
| E2 | second vertical plane of 9 |
| E3 | third vertical plane of 10 |
| F | flow direction |
| h | height of 1 |
| L | longitudinal axis of 2 |
| M | center line of 1 |
| P1 | first, upstream tangent point |
| P2 | second, downstream tangent point |
| sb,min | minimum clear bar spacing; min. inter-bar distance of 1 |
| sb | inter-bar distance downstream of sb,min |
| tb,max, | maximum, first thickness of 1 at widest part of cross section |
| tb | second thickness of 1 downstream of tb, max |
| T1 | upstream tangential at 3 |
| T2 | downstream tangential at 4 |
| V | vertical direction of 2 |
| W | watercourse |
| x | upstream half of 1 |
| y | downstream half of 1 |
| Z1 | middle of circle C1, intersection point of L and M in 3 |
| Z2 | middle of circle C2, intersection point of L and M in 4 |
| α | horizontal rack angle |
| β | flow bar attack angle of 1 |
| δ | outflow angle |

REFERENCES

Albayrak, I., Boes, R. M., Kriewitz, C. R., Peter, A., Tullis, B. P. (2020). Fish guidance structures: hydraulic performance and fish guidance efficiencies. *Journal of Ecohydraulics*, 5(2): 113-131, https://doi.org/10.1080/24705357.2019.1677181.

Amaral, S. V., Winchell, F. C., McMahon, B. J., Dixon, D. (2003). Evaluation of angled bar racks and louvers for guiding silver phase American eels. *Proc. Biology, Management and Protection of Catadromous Eels*, 367-376, D. A. Dixon, ed. American Fisheries Society, Bethesda MD.

Beck (2020), Fish protection and fish guidance at water intakes using innovative curved-bar rack bypass systems; VAW-Mitteilung 257 (R. M. Boes, ed.). Laboratory of Hydraulics, Hydrology and Glaciology, ETH Zurich, Switzerland.

Beck, C., Albayrak, I., Meister, J., Boes R. M. (2020a). Hydraulic performance of fish guidance structures with curved bars: Part 1: Head loss assessment. *Journal of Hydraulic Research*, 58(5), 807-818, https://doi.org/10.1080/00221686.2019.1671515.

Beck, C., Albayrak, I., Meister, J., Boes R. M. (2020b). Hydraulic performance of fish guidance structures with curved bars: Part 2: Flow fields. *Journal of Hydraulic Research*, 58(5): 819-830, https://doi.org/10.1080/00221686.2019.1671516.

Beck, C., Albayrak, I., Meister, J., Peter, A., Selz, O. M., Leuch, C.; Vetsch, D. F., Boes, R. M. (2020). Swimming Behavior of Downstream Moving Fish at Innovative Curved-Bar Rack Bypass Systems for Fish Protection at Water Intakes. *Water* 12 (11), 3244, https://doi.org/10.3390/wi2113244.

EPRI (Electric Power Research Institute) (1999). Review of Downstream fish passage and protection technology evaluations and effectiveness. Alden Research Laboratory, Inc., EPRI Report No. TR-111517.

EPRI (Electric Power Research Institute) and Dominion Millstone Laboratories (2001). Evaluation of angled bar racks and louvers for guiding fish at water intakes. Report 1005193: 106. Palo Alto, C A and Waterford, CT.

Kriewitz, C. R. (2015). Leitrechen an Fischabstiegsanlagen—Hydraulik und fischbiologische Effizienz ('Guidance screens at fish protection facilities—Hydraulics and fish-biological efficiency'). VAW-Mitteilung 230, R. M. Boes, ed. Laboratory of Hydraulics, Hydrology and Glaciology (VAW), ETH Zurich, Zurich, Switzerland (in German).

Raynal, S., Chatellier, L., Courret, D., Larinier, M., Laurent, D. (2013). An experimental study on fish-friendly trashracks—Part 2. Angled trashracks. *Journal of Hydraulic Research,* 51(1), 67-75.

Shepherd, D., Katopodis, C., & Rajaratnam, N. (2007). An experimental study of louvers for fish diversion. *Canadian Journal of Civil Engineering,* 34(6), 770-776.

Schuler, V. J., Larson, L. L. (1975). Improved fish protection at intake systems. *J. Environ. Eng. Div., ASCE* 101(6), 897-910.

Taft, E. P., Hofmann, P., Eisle, P. J., Horst, T. (1976). An experimental approach to the design of systems for alleviating fish impingement at existing and proposed power plant intake structures. *Third Natl. Workshop Entrain. and Impinge,* 343-365. Ecological Analysts Inc., Melville, NY.

The invention claimed is:

1. A fish guidance rack for use in a fish guidance system in a watercourse, the fish guidance rack comprising a series of vertical bars mounted on a rack frame along a longitudinal axis of the fish guidance rack between a first end of the fish guidance rack and a second end of the fish guidance rack, wherein the bars each comprises a first, upstream half beginning with an upstream tip and a second, downstream half ending in a downstream tip, wherein the downstream half adjoins the upstream half in a downstream direction of the bar with respect to a flow direction of the watercourse in an installed state of the rack, wherein at least a number of the bars each comprises, at least along a part of a depth of the bar, a convex curvature of a first upstream side with respect to the first, upstream end of the fish guidance rack, wherein, in a horizontal cross section, the bars each comprises a maximum, first thickness in the first, upstream half of each bar, wherein the fish guidance rack comprises a minimum clear bar spacing between respective upstream halves of neighboring bars measured along the longitudinal axis of the rack, and wherein, in a downstream direction from respective locations of maximum, first thickness in respective upstream halves of neighboring bars to the respective downstream tips, a clear bar spacing between neighboring bars in the fish guidance rack either only increases or remains partially equal and partially increases.

2. The fish guidance rack according to claim 1, wherein the bars each comprises, at least along a part of the depth of the bar, a concave curvature of a second downstream side with respect to the second, downstream end of the fish guidance rack.

3. The fish guidance rack according to claim 1, wherein the maximum, first thickness of the bar is in the range of 8-16 mm, and the second thickness at a narrowest part in the second, downstream half of the bar in the horizontal cross section is in the range of 4-8 mm.

4. The fish guidance rack according to claim 1, wherein the thickness of each bar in the horizontal cross section continuously decreases from the location of maximum, first thickness to the second, downstream tip, such that the clear bar spacing between neighboring bars continuously increases in the fish guidance rack from the respective locations of maximum, first thickness in the downstream direction to the respective second, downstream tips of neighboring bars.

5. The fish guidance rack according to claim 1, wherein a depth of each bar, measured in the horizontal cross section along a center line, is larger than the maximum, first thickness of each bar.

6. The fish guidance rack according to claim 5, wherein the depth of each bar lies between three times the maximum, first thickness and fifteen times the maximum, first thickness of the bar.

7. The fish guidance rack according to claim 5, wherein the depth of each bar is in the range of 60-100 mm.

8. The fish guidance rack according to claim 1, wherein the location comprising the maximum, first thickness of each bar is arranged within a region encompassing maximum one fourth of the depth of the bar.

9. The fish guidance rack according to claim 1, wherein, in an installed state of the rack in the watercourse, the rack comprises, at the second, downstream tip of each bar, a downstream outflow angle, with respect to the flow direction of the watercourse, which is smaller than the upstream bar-flow attack angle at the first, upstream tip of the bar.

10. The fish guidance rack according to claim 9, wherein, in an installed state of the rack in the watercourse, the rack comprises, at the second, downstream tip of each bar, a downstream outflow angle of 0°-45°, with respect to a flow direction of the watercourse.

11. The fish guidance rack according to claim 9, wherein the fish guidance rack comprises an upstream bar-flow attack angle of at the most 90°, with respect to a flow direction of the watercourse.

12. The fish guidance rack according to claim 1, wherein, in an installed state of the rack in the watercourse, the fish guidance rack comprises a horizontal rack angle of 0-90°, to a flow direction of the watercourse, wherein the horizontal rack angle is measured between a first longitudinal axis of the fish guidance rack and the flow direction of the watercourse in a plane parallel to a surface of the water course.

13. The fish guidance rack according to claim 1, wherein at least one of the upstream tip and the downstream tip of each bar is rounded.

14. The fish guidance rack according to claim 1, wherein the bars are arranged in a spaced apart manner along the longitudinal axis of the rack from a first, upstream end of the fish guidance rack to a second, downstream end of the fish guidance rack.

15. The fish guidance rack according to claim 14, wherein the bars are arranged in an equidistant manner along the longitudinal axis of the rack from the first, upstream end of the fish guidance rack to the second, downstream end of the fish guidance rack.

16. The fish guidance rack according to claim 1, wherein the minimum clear bar spacing lies in a range of 25-50 mm.

17. The fish guidance rack according to claim 1, comprising a bottom overlay, which covers a bottom portion of a front face of the rack.

18. The fish guidance rack according to claim 17, wherein the bottom overlay covers the bottom portion of the front face of the rack across essentially the entire length of the rack.

19. The fish guidance rack according to claim 17, wherein the bottom overlay or the top overlay, respectively, each covers at the most 25% of a wetted height of the bars.

20. A fish guidance system comprising a watercourse having a flow direction, and further comprising a bypass channel and a fish guidance rack according to claim 1, wherein the fish guidance rack extends across an intake canal or power canal and is suitable to guide fish in the watercourse along a longitudinal axis towards the bypass channel of the fish guidance system.

21. The fish guidance system according to claim 20, wherein the fish guidance rack comprises a horizontal rack angle of 0-90° to a flow direction of the watercourse, wherein the horizontal rack angle is measured between a first longitudinal axis of the fish guidance rack and the flow direction of the watercourse in a plane parallel to a surface of the water course.

22. The fish guidance system according to claim 20, wherein the fish guidance rack comprises, at the second, downstream tip of each bar, a downstream outflow angle, with respect to the flow direction of the watercourse, which is smaller than the upstream bar-flow attack angle at the first, upstream tip of the bar.

23. The fish guidance system according to claim 20, wherein the watercourse is delimited on a first side by a first limiting structure extending in a first vertical plane along the flow direction, and on a second side by a second limiting structure extending in a second vertical plane along the flow direction, and wherein a third limiting structure extending in a third vertical plane along the flow direction is arranged between the first limiting structure and the second limiting structure, said third intermediate limiting structure dividing the watercourse into a first section and a second section, and wherein the fish guidance rack extends partially across the watercourse.

24. The fish guidance system according to claim 23, wherein the first limiting structure and the second limiting structure each extends parallel to the flow direction.

25. Fish guidance system according to claim 23, wherein the third limiting structure extends parallel to the first limiting structure and the second limiting structure.

26. Fish guidance system according to claim 23, wherein the first section is a power canal and the second section is the bypass channel.

27. Fish guidance system according to claim 23, wherein the fish guidance rack extends across the first section from said first limiting structure to said third intermediate limiting structure.

28. Fish guidance system according to claim 27, wherein the fish guidance rack extends across the first section at a horizontal rack angle of 0-90° to the direction of flow.

29. The fish guidance system according to claim 20, wherein the fish guidance rack comprises a downstream outflow angle of 0°-45° with respect to the flow direction of the watercourse.

30. The fish guidance system according to claim 20, wherein the rack in an installed state in the watercourse comprises an upstream bar-flow attack angle of at the most 90° with respect to the flow direction of the watercourse.

31. Fish guidance system according to claim 20, wherein at least a number of the bars are curved in a convex manner with respect to the first, upstream end of the rack.

32. Fish guidance system according to claim 20, wherein at least a number of the bars are curved in a concave manner with respect to the second, downstream end of the rack.

33. The fish guidance rack according to claim 1, wherein the fish guidance rack only comprises bars of a same uniform shape.

34. The fish guidance rack according to claim 1, comprising a top overlay, which covers a top portion of the front face of the rack.

35. The fish guidance rack according to claim 34, wherein the top overlay covers the top portion of the front face of the rack across essentially the entire length of the rack.

36. The fish guidance rack according to claim 1, wherein, for each bar, the maximum, first thickness is greater than any thickness of the bar downstream of the maximum first thickness.

* * * * *